(12) United States Patent
Tsuji

(10) Patent No.: US 6,456,049 B2
(45) Date of Patent: Sep. 24, 2002

(54) POWER SUPPLY DEVICE AND INFORMATION PROCESSING APPARATUS PROVIDING A STABLE POWER SUPPLY

(75) Inventor: Hiroyuki Tsuji, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/805,886

(22) Filed: Mar. 15, 2001

(30) Foreign Application Priority Data

Jun. 14, 2000 (JP) ............................... 2000-178160

(51) Int. Cl.[7] ............................................. G05F 1/56
(52) U.S. Cl. ..................... 323/282; 323/283; 323/351
(58) Field of Search ............................ 323/282, 283, 323/351

(56) References Cited

U.S. PATENT DOCUMENTS

| | | | | |
|---|---|---|---|---|
| 4,315,207 A | | 2/1982 | Apfel | 323/284 |
| 4,752,699 A | | 6/1988 | Cranford, Jr. et al. | 307/297 |
| 5,408,173 A | * | 4/1995 | Knapp | 323/282 |
| 5,828,206 A | * | 10/1998 | Hosono et al. | 323/282 |
| 5,969,515 A | * | 10/1999 | Oglesbee | 323/283 |
| 5,987,615 A | * | 11/1999 | Danstrom | 323/351 |
| 6,127,816 A | * | 10/2000 | Hirst | 323/283 |

* cited by examiner

*Primary Examiner*—Jeffrey Sterrett
(74) *Attorney, Agent, or Firm*—Finnegan, Henderson, Farabow, Garrett & Dunner, L.L.P.

(57) ABSTRACT

The present invention is a power supply device including a power input terminal which inputs a DC voltage, a DC/DC converter which has a feedback terminal and converts the input DC voltage from the power input terminal, a power output terminal which outputs the DC voltage converted by the DC/DC converter, a voltage generator which supplies a voltage, and a resistor which is connected between the power output terminal and the voltage generator. The feedback terminal is connected between the register and voltage generator.

14 Claims, 3 Drawing Sheets

POWER SUPPLY DEVICE AND INFORMATION PROCESSING APPARATUS PROVIDING A STABLE POWER SUPPLY

CROSS-REFERENCE TO RELATED APPLICATIONS

This application is based upon and claims the benefit of priority from the prior Japanese Patent Application No. 2000-178160, filed Jun. 14, 2000, the entire contents of which are incorporated herein by reference.

BACKGROUND OF THE INVENTION

The present invention relates to a power supply device and an information processing apparatus and, more particularly, to a power supply device for generating a predetermined power supply voltage and an information processing apparatus having this power supply device.

The recent spread of information processing apparatus is remarkable in every field. In particular, portable information processing apparatus such as portable computers and personal digital assistants are used in a wide variety of fields as their capabilities have improved.

Batteries are often used as power supplies of such information processing apparatus. Since these information processing apparatus are presently used more frequently than before, it is desired by the users to reduce the consumption power and prolong the driving time of the information processing apparatus.

To this end, it is being attempted to reduce the operating power supply voltage of an MPU (Micro Processor Unit) as one constituent semiconductor device of an information processing apparatus.

On the other hand, as the semiconductor device fabrication technologies have improved in recent years, micropatterning of the structures of semiconductor devices such as an MPU is in progress. In micropatterned semiconductor devices, the voltage of an operating power supply is lowered to prevent dielectric breakdown. That is, the operating power supply voltages of semiconductor devices such as an MPU in information processing apparatus are increasingly lowering.

Also, for the sake of energy saving, technologies which dynamically change the operating frequency and operating voltage of an MPU have been developed. In an information processing apparatus using this type of an MPU, control of a power supply voltage to be supplied to the MPU must also be taken into consideration.

The arrangement of a conventional power supply device will be described below with reference to an accompanying drawing.

FIG. 1 is a circuit diagram showing the arrangement of this conventional power supply device. A power input terminal 601 inputs power to be converted into output power. A power output terminal 602 outputs power converted by a DC/DC converter IC 603 to be described later. The DC/DC converter IC 603 is an IC which controls the conversion of the input power from the power input terminal 601 into power to be output to the power output terminal 602.

An MPU 600 executes processing of an information processing apparatus incorporating this power supply device. This MPU 600 also sets the value of an output power supply voltage from this power supply device into the DC/DC converter IC 603.

The MPU 600 sets this value by setting a 5-bit D/A code (digital/analog code) in the DC/DC converter IC 603. The set value is reflected on the value of a reference voltage in the DC/DC converter IC 603. A voltage range thus settable by the MPU 600 is called an adjustment range.

A converter circuit is formed by the DC/DC converter IC 603, a capacitor 604, a coil 605, a FET 606, and a rectifier 607. The capacitor 604 and the coil 605 function as an output filter. The FET 606 serves as a switch. The output power supply voltage from the power output terminal 602 can be adjusted by controlling switching of this FET 606 by the DC/DC converter IC 603.

A feedback terminal 608 of the DC/DC converter IC 603 feeds the converted voltage from the converter circuit back to the DC/DC converter IC 603.

Upon receiving this feedback, the DC/DC converter IC 603 checks whether voltage conversion is appropriately performed. This check is done by comparing the feedback value with the above-mentioned value of the reference voltage corresponding to the setting by the MPU 600.

If there is a large difference between the feedback voltage value and the value of the reference voltage, the DC/DC converter IC 603 controls switching of the FET 606, thereby appropriately performing voltage conversion.

With this arrangement, the DC/DC converter IC 603 monitors the voltage fed back to its feedback terminal and controls the operation of the switch, thereby varying the output voltage within the adjustment range settable by the MPU 600.

For a voltage exceeding the adjustment range, however, the DC/DC converter IC 603 cannot perform any setting exceeding this range, so this power supply device cannot control the voltage. In particular, a DC/DC converter having a narrow adjustment range is highly likely to be unable to control a voltage required by an MPU, if the driving voltage of the MPU dynamically changes.

Even when the adjustment range is wide, accuracy often lowers near the upper and lower limits of the range. If the accuracy of voltage control lowers, it becomes difficult to drive a semiconductor device, such as an MPU, having strict conditions on the accuracy of operating voltage.

The above conventional technology cannot vary the output voltage outside the adjustment range set by a D/A converter or the like. If this adjustment range is narrow and the power supply voltage required by an MPU dynamically changes to the outside of the adjustment range, this voltage exceeds the possible output range of a DC/DC converter. This makes the conventional DC/DC converter unable to supply power to the objective MPU.

BRIEF SUMMARY OF THE INVENTION

The present invention has been made to solve the above problem, and has as its object to provide a power supply device capable of stably supplying power even to an MPU whose necessary power supply voltage dynamically changes, and an information processing apparatus having this power supply device.

To achieve the above object, according to the first aspect of the present invention, there is provided a power supply device comprising a power input terminal which inputs a DC voltage; a DC/DC converter, having a feedback terminal, which converts the input DC voltage from the power input terminal;

a power output terminal which outputs the DC voltage converted by the DC/DC converter;

a voltage generator which supplies a voltage; and a resistor connected between the power output terminal and the voltage generator, wherein the feedback terminal is connected between the register and voltage generator.

In the power supply device having this arrangement, the input voltage to the feedback terminal is made to have a value different from the output voltage from the power output terminal, by the resistor connecting the power output terminal and the voltage generator. Accordingly, a lower voltage can be supplied.

According to the second aspect of the present invention, there is provided a power supply device comprising a power input terminal which inputs a DC voltage;

a DC/DC converter, having a feedback terminal, which converts the input DC voltage from the power input terminal;

a power output terminal which outputs the DC voltage converted by the DC/DC converter;

a current source which supplies a predetermined current; and a resistor connected between the power output terminal and the voltage generator, wherein the feedback terminal is connected between the register and current source.

In the power supply device having this arrangement, the input voltage to the feedback terminal is made to have a value different from the output voltage from the power output terminal, by the resistor connecting the power output terminal and the current source. Accordingly, a lower voltage can be supplied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Each embodiment of the present invention will be described below with reference to the accompanying drawings.

Figure 1:
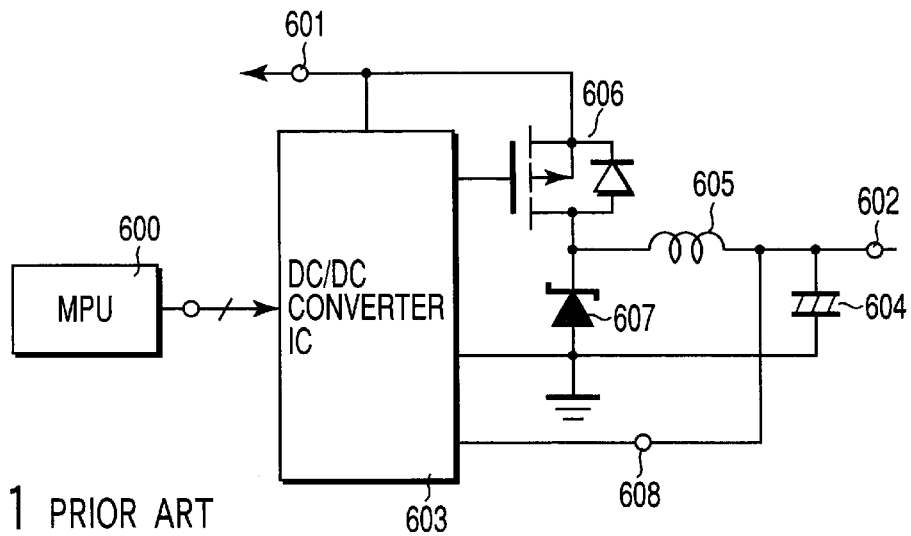
FIG. 1 is a circuit diagram showing the arrangement of a conventional power supply device.
Figure 2:
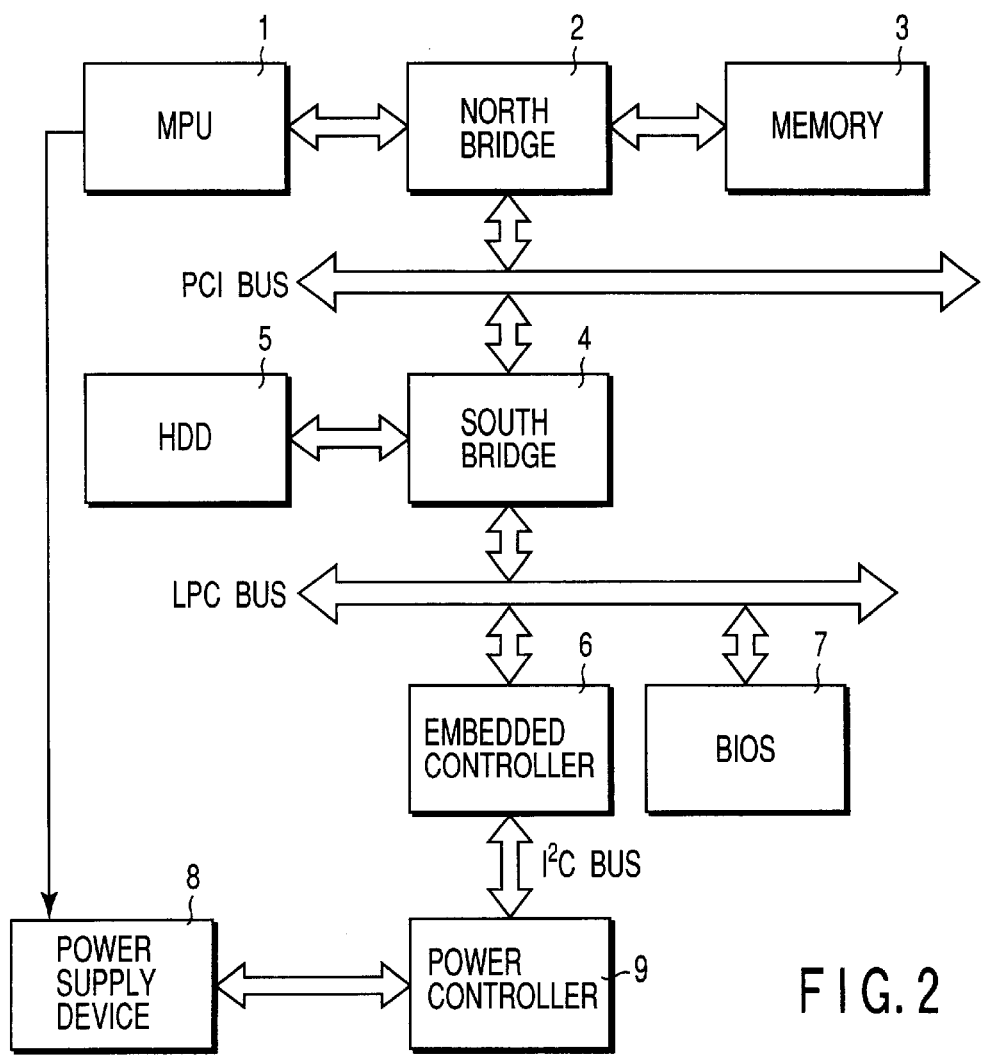
FIG. 2 is a block diagram showing the arrangement of an information processing apparatus using a power supply device according to the first embodiment of the present invention.

The first embodiment will be described first with reference to FIG. 2. FIG. 2 is a block diagram showing the arrangement of an information processing apparatus according to the first embodiment of the present invention. An MPU 1 controls this information processing apparatus and performs information processing. This MPU 1 also performs settings for a power supply device 8 to be described later. A North bridge 2 is a bridge device for connecting the MPU 1 to a PCI bus and a memory 3. The memory 3 is a storage device for expanding programs to be executed by this information processing apparatus and expanding data. A South bridge 4 is a bridge device for connecting the PCI bus and an LPC bus. An HDD (Hard Disk Drive) 5 is a nonvolatile storage device for storing software and the like to be used by this information processing apparatus.

An EC (Embedded Controller) 6 is an interface between a power controller and the system. A BIOS (Basic I/O System) 7 stores programs for controlling the operation when this information processing apparatus is activated and stores basic I/O programs.

The power supply device 8 converts power from an AC power supply or a battery (neither is shown) into driving power suited to this information processing apparatus and supplies the power (power lines are not shown). As will be described later with reference to FIG. 3, this power supply device 8 contains a DC/DC converter IC 103 and a reference voltage generator 109. A power controller 9 controls the power supply device 8 by exchanging information with the EC 6. This information exchange between the EC 6 and the power controller 9 is performed using an I$^2$C bus. The power controller 9 monitors the temperature of the power supply device and the like and thereby can perform fine power control.

Figure 3:
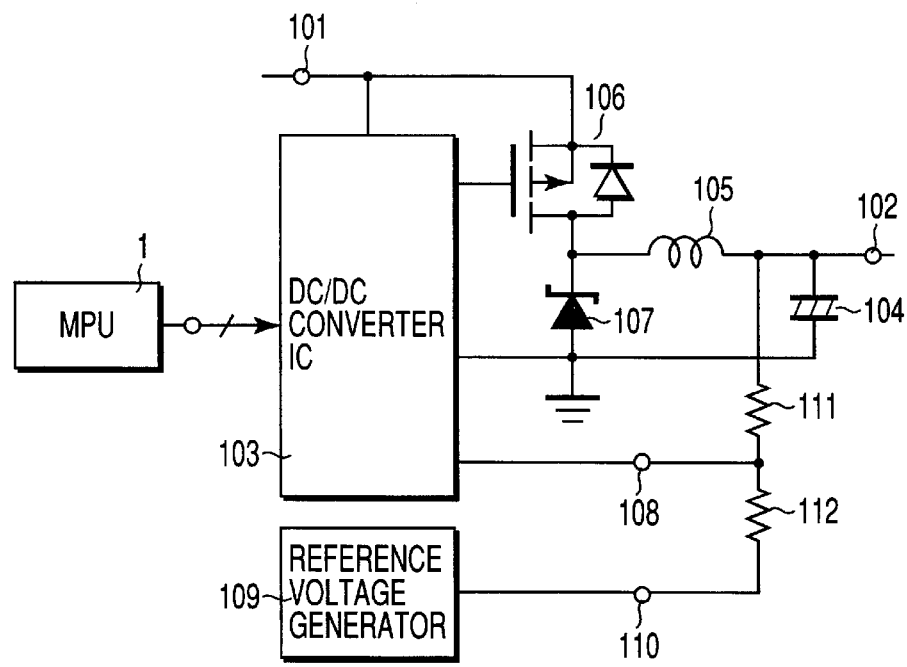
FIG. 3 is a circuit diagram showing the arrangement of the power supply device according to the first embodiment of the present invention.

The power supply device 8 of the present invention will be described below with reference to FIG. 3. A power input terminal 101 inputs power to be converted into output power. A power output terminal 102 outputs power converted by the DC/DC converter IC 103 to be described later. This DC/DC converter IC 103 is an IC for controlling the conversion of the input power from the power input terminal 101 into power to be output to the power output terminal 102.

As described above, the MPU 1 sets the value of an output power supply voltage from this power supply device into the DC/DC converter IC 103. The MPU 1 sets this value by setting a 5-bit D/A code (digital/analog code) in the DC/DC converter IC 103. The set value is reflected on the value of a reference voltage in the DC/DC converter IC 103.

A converter circuit is formed by the DC/DC converter IC 103, a capacitor 104, a coil 105, a FET 106, and a diode 107. The capacitor 104 and the coil 104 function as a filter. The FET 106 serves as a switch. The output power supply voltage from the power output terminal 102 can be adjusted by controlling switching of this FET 106 by the DC/DC converter IC 103.

A feedback terminal 108 of the DC/DC converter IC 103 feeds the converted voltage from the converter circuit back to the DC/DC converter IC 103. Upon receiving this feedback, the DC/DC converter IC 103 checks whether voltage conversion is appropriately performed. This check is done by comparing the feedback value with the above-mentioned value of the reference voltage corresponding to the setting by the MPU 1. If there is a large difference between the feedback voltage value and the value of the reference voltage, the DC/DC converter IC 103 controls switching of the FET 106, thereby appropriately performing voltage conversion.

A reference voltage generator 109 generates a reference voltage for obtaining a predetermined power supply output from a reference voltage output 110.

In the present invention, the reference voltage output 110 from the reference voltage generator 109 and the power output terminal 102 are connected by first and second resistors 111 and 112, and the midpoint between these first and second resistors 111 and 112 is connected to the feedback terminal 108. This permits control of a voltage range required by the MPU even if this voltage range is outside the range of the DC/DC converter IC 103. In this embodiment, the number of resistors is two, and the midpoint between them is taken as the feedback terminal 108. However, resistors can be further added. Especially when systems are used in different environments, it is convenient to add small resistors since the resistance values can be finely adjusted. Also, when this information processing apparatus is actually operated, a voltage margin must be ensured for a stable operation. Adding resistors for this purpose is useful.

Figure 4:
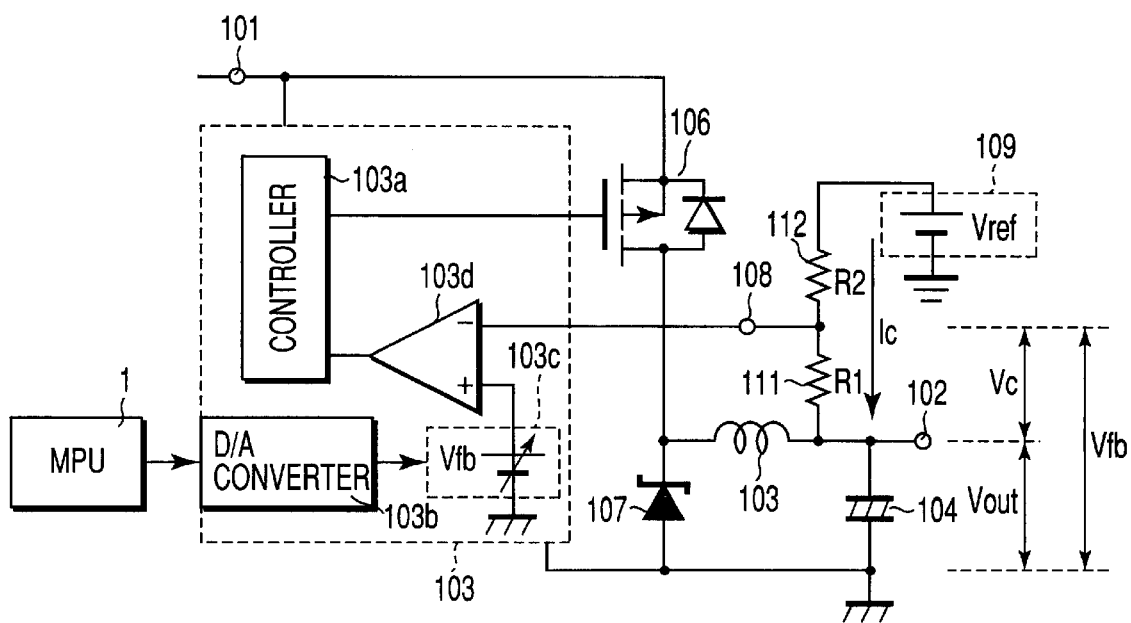
FIG. 4 is a schematic view showing the operation of the power supply device according to the first embodiment of the present invention.

Details of the operation of the present invention will be described below with reference to FIG. 4. FIG. 4 is a schematic view showing a portion of FIG. 3 in detail to give a supplementary note to the voltage relationship. To simplify this voltage relationship, the arrangement is partly changed from FIG. 3. However, the same reference numerals denote the same parts as in FIG. 3. FIG. 4 also shows the internal arrangement of the DC/DC converter IC 103.

The DC/DC converter IC 103 contains a switching controller 103a, a digital-to-analog converter 103b, a feedback reference voltage generator 103c, and a comparator 103d. The digital-to-analog converter 103b converts the value set by the MPU 1. The feedback reference voltage generator 103c in the DC/DC converter IC 103 generates a voltage corresponding to the converted value.

This feedback reference voltage generated by the feedback reference voltage generator 103c is compared with the value of an input voltage (to be referred to as Vfb hereinafter) from the feedback terminal 108 of the DC/DC converter IC 103. In accordance with the comparison result, the controller 103a in the DC/DC converter IC 103 controls switching of the FET 106.

For an explanation purpose, let Vout denote the voltage of the power output terminal 102 and Vref the voltage generated by the reference voltage generator 109.

In the conventional power supply device, the input voltage Vfb from the feedback terminal 108 and the voltage Vout of the power output terminal 102 are equal. In the present invention, this voltage relationship can be changed by using the reference voltage generator 109 and the first and second resistors 111 and 112. Let R1 denote the resistance value of the first resistor and R2 the resistance value of the second resistor.

First, the value of a current Ic flowing through the first and second resistors 111 and 112 will be explained. Ic is obtained by dividing the difference between Vref and Vout by the sum of R1 and R2; Ic=(Vref−Vout)/(R1+R2).

In the present invention, the feedback terminal 108 of the DC/DC converter IC 103 is connected between the first and second resistors 111 and 112. Therefore, Vfb is the sum of Vout and a voltage drop generated by the current Ic in the first resistor 111. Letting Vc be the magnitude of the voltage drop generated in the first resistor 111, this Vc is represented by the product of Ic and R1; Vc=Ic×R1.

When this Ic is used, Vfb is represented by the sum of Vout and Vc; Vfb=Vout+Vc. From this relationship, Vout is obtained by subtracting Vc from Vfb. That is, in the present invention, the actual voltage of the power supply output can be made lower than the voltage of the feedback terminal 108 of the DC/DC converter IC 103 by using the voltage drop generated by the reference voltage generator 109 and the first resistor 111.

In effect, the DC/DC converter IC 103 processes the voltage Vfb at its feedback terminal, and the power output terminal 102 of the power supply device can generate Vout, a stable accurate low-voltage power. In practice, when the control range of the DC/DC converter IC is 1.25 to 2.00V, the voltage can be further lowered by 0.15V.

Figure 5:
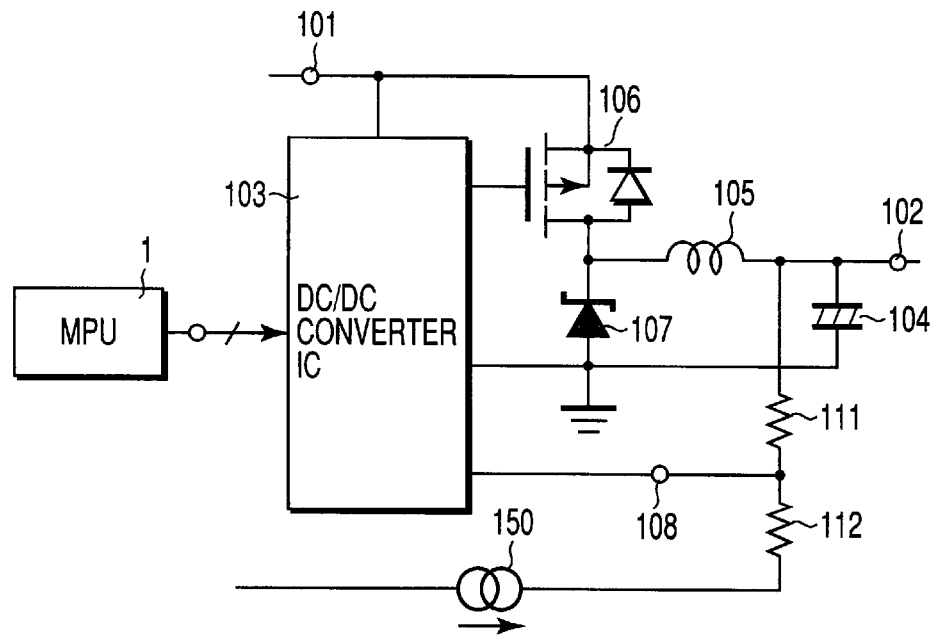
FIG. 5 is a circuit diagram showing the arrangement of a power supply device according to the second embodiment of the present invention.

The second embodiment of the present invention will be described below with reference to an accompanying drawing. This second embodiment uses a constant-current source instead of the reference voltage generator 109 in the first embodiment. FIG. 5 is a circuit diagram showing the arrangement of a power supply device according to the second embodiment of the present invention. When connected to a second resistor 112, a constant-current source 150 can be used in place of the reference voltage generator 109 in the first embodiment.

The second embodiment stabilizes the voltage generated in the second resistor more than the first embodiment and can output voltage with higher accuracy over a broader range than in the first embodiment. That is, in the first embodiment the reference voltage generated by the reference voltage generator always takes a constant value. Hence, even when a new value is to be set for Vout, the current value Ic changes and the voltage drop Vc also changes because the value of Vref remains constant. To obtain higher accuracy for a desired output voltage, therefore, the feedback reference voltage of the DC/DC converter IC 103 must be set by taking account of the change in the voltage drop Vc.

In contrast, the second embodiment is advantageous in increasing the accuracy of control since variations in the value of the voltage drop are prevented by supplying a constant current to a resistor.

As another embodiment of the present invention, the reference voltage generator in the first embodiment can also be a power supply of another device operating in the information processing apparatus. For example, a power supply of the HDD can be used as the reference voltage generator. In the information processing apparatus of this embodiment, the power supply voltage of the HDD is 5V, and this value is generally lower than a power supply voltage (15V) before conversion.

When the voltage generated by the reference voltage generator is 5V, for example, energy is taken by, e.g., heat generated by an electric current in the conversion from 15V into 5V. With the arrangement of this embodiment, the power conversion loss when the reference voltage is generated can be reduced. This can prolong the battery driving time.

A power supply of a CD drive or a power supply of a DVD drive can also be used as the reference voltage generator, instead of the power supply of the HDD. When the HDD is accessed frequently and so the supply of operating power to the HDD may become unstable, a power supply of a CD drive or a power supply of a DVD drive can be used as the reference voltage generator.

Figure 6:
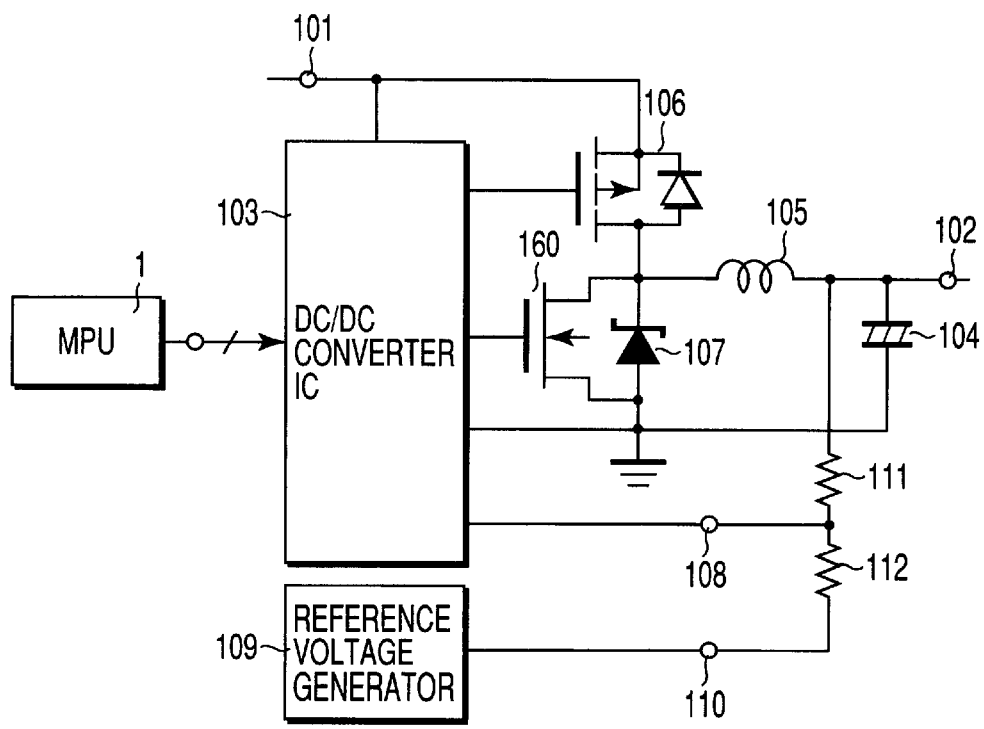
FIG. 6 is a circuit diagram showing the arrangement of a power supply device according to an embodiment in which a synchronous rectification system is introduced to the first embodiment of the present invention.

Each of the above embodiments can also be practiced by a synchronous rectification system, as shown in FIG. 6, in which an NMOSFET 160 is connected in parallel with the diode 107. In this synchronous rectification system, high-efficiency conversion can be performed since the DC/DC converter IC 103 operates the NMOSFET 160 and the FET 106 in synchronism with each other. Energy saving is accomplished by this highly efficient conversion.

These embodiments can be selectively used in accordance with the arrangement of the information processing apparatus.

As has been described above, the present invention allows stable power supply even when a necessary power supply voltage dynamically changes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply device comprising:
   a power input terminal which inputs a DC voltage;
   a DC/DC converter, having a feedback terminal, which converts the input DC voltage from said power input terminal;
   a power output terminal which outputs the DC voltage converted by said DC/DC coverter;
   a voltage generator which supplies a voltage to control a voltage output from the power output terminal;
   a first resistor connected between said power output terminal and said feedback terminal; and
   a second resistor connected between the first resistor and the voltage generator,
   wherein the feedback terminal is connected between the first resistor and the second resistor.

2. A device according to claim 1, wherein said DC/DC converter converts the DC voltage in accordance with external setting.

3. A device according to claim 1, wherein said DC/DC converter comprises:
   a control signal output unit which outputs a control signal for converting the input DC voltage from said power input terminal into a predetermined voltage, on the basis of an externally input value and an input feedback voltage from said feedback terminal; and
   a switching element which converts the input DC voltage from said power input terminal, on the basis of the output control signal from said control signal output unit.

4. A device according to claim 3, wherein said switching element is a FET.

5. A device according to claim 3, wherein said DC/DC converter is inserted between said switching element and said power output terminal, and further comprises a filtering element which filters the DC voltage converted by said switching element.

6. A device according to claim 1, wherein the output converted DC voltage from said power output terminal is different from the input voltage to said feedback terminal.

7. A power supply device comprising:
   a power input terminal which inputs a DC voltage;
   a DC/DC converter, having a feedback terminal, which converts the input DC voltage from said power input terminal;
   a power output terminal which outputs the DC voltage converted by said DC/DC converter.
   a current source which supplies a predetrmined current to control a voltage output from the power output terminal;
   a first resistor connected between said power output terminal and said feedback terminal; and
   a second resistor connected between the first resistor and the current source,
   wherein the feedback terminal is connected between the first resistor and the second resistor.

8. A device according to claim 7, wherein said DC/DC converter converts the DC voltage in accordance with external setting.

9. A device according to claim 7, wherein said DC/DC converter comprises:
   a control signal output unit which outputs a control signal for converting the input DC voltage from said power input terminal into a predetermined voltage, on the basis of an externally input value and an input feedback voltage from said feedback terminal; and
   a switching element which converts the input DC voltage from said power input terminal, on the basis of the output control signal from said control signal output unit.

10. A device according to claim 9, wherein said switching element is a FET.

11. A device according to claim 9, wherein said DC/DC converter is inserted between said switching element and said power output terminal, and further comprises a filtering element which filters the DC voltage converted by said switching element.

12. A device according to claim 7, wherein the output converted DC voltage from said power output terminal is different from the input voltage to said feedback terminal.

13. An information processing apparatus comprising:
   a processor which outputs a control signal for converting voltage;
   a power input terminal which inputs a DC voltage;
   a DC/DC converter, having a feedback terminal, which converts the input DC voltage from said power input terminal;
   a power output terminal which outputs the DC voltage converted by said DC/DC converter;
   a voltage generator which supplies a voltage to control a voltage output from the power output terminal;
   a switching element, connected between the DC/DC converter and the power output terminal, to convert the input DC voltage from the power input terminal;
   a filtering element, connected between the switching element and the power output terminal, to filter the DC voltage converted by the switching;
   a first resistor connected between said power output terminal and said feedback terminal; and
   a second resistor connected between the first resistor and the voltage generator,
   wherein the feedback terminal is connected beween the first resistor and the second resistor.

14. An information processing apparatus comprising:
   a processor which outputs a control signal for converting voltage;
   a power input terminal which inputs a DC voltage;
   a DC/DC converter, having a feedback terminal, which converts the input DC voltage from said power input terminal;
   a power output terminal which outputs the DC voltage converted by said DC/DC converter;

a current source which supplies a current to control a voltage output from the power output terminal;

a switching element, connected between the DC/DC converter and the power output terminal, to convert the input DC voltage from the power input terminal;

a filtering element, connected between the switching element and the power output terminal, to filter the DC voltage converted by the switching element.

a first resistor connected between said power output terminal and said feedback terminal; and a second resistor connected between the first resistor and the current source, wherein the feedback terminal is connected between the first resistor and the second resistor.

* * * * *

UNITED STATES PATENT AND TRADEMARK OFFICE
CERTIFICATE OF CORRECTION

PATENT NO.     : 6,456,049 B2
DATED          : September 24, 2002
INVENTOR(S)    : Tsuji It is certified that error appears in the above-identified patent and that said Letters Patent is hereby corrected as shown below:

<u>Column 7,</u>
Line 24, change "coverter;" to -- converter; --.
Line 65, change "predetrmined" to -- predetermined --.

<u>Column 9,</u>
Line 8, change "element." to -- element; --.

Signed and Sealed this

Twenty-fifth Day of March, 2003

JAMES E. ROGAN
*Director of the United States Patent and Trademark Office*